(12) United States Patent
Chikura et al.

(10) Patent No.: US 9,504,963 B2
(45) Date of Patent: Nov. 29, 2016

(54) SPIRAL SEPARATION MEMBRANE ELEMENT

(75) Inventors: Shinichi Chikura, Osaka (JP);
Toshimitsu Hamada, Osaka (JP);
Yasuhiro Uda, Osaka (JP); Kazuhito Yoshida, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 343 days.

(21) Appl. No.: 13/976,317

(22) PCT Filed: Dec. 22, 2011

(86) PCT No.: PCT/JP2011/007212
§ 371 (c)(1),
(2), (4) Date: Jul. 23, 2013

(87) PCT Pub. No.: WO2012/090457
PCT Pub. Date: Jul. 5, 2012

(65) Prior Publication Data
US 2013/0299416 A1  Nov. 14, 2013

(30) Foreign Application Priority Data
Dec. 27, 2010 (JP) .................. 2010-289481

(51) Int. Cl.
*B01D 63/10* (2006.01)
*B01D 65/00* (2006.01)

(52) U.S. Cl.
CPC .............. *B01D 63/10* (2013.01); *B01D 65/00* (2013.01); *B01D 2313/00* (2013.01); *B01D 2313/02* (2013.01); *B01D 2313/12* (2013.01)

(58) Field of Classification Search
CPC .... B01D 63/10; B01D 63/12; B01D 63/106; B01D 2313/02; B01D 2313/04; B01D 2313/13; B01D 2313/21; B01D 2319/02; B01D 2319/022
See application file for complete search history.

(56) References Cited

U.S. PATENT DOCUMENTS

| 3,117,015 A | * | 1/1964 | Baker et al. .................. 106/278 |
| 3,177,015 A | * | 4/1965 | Brown .................. F16L 21/005 285/236 |
| 3,928,204 A | * | 12/1975 | Thomas ................. B01D 63/12 210/232 |
| 4,842,736 A | * | 6/1989 | Bray ..................... B01D 63/10 210/321.61 |
| 4,842,936 A | * | 6/1989 | Kashihara et al. .......... 428/407 |

(Continued)

FOREIGN PATENT DOCUMENTS

| JP | 1-115410 | 5/1989 |
| JP | 4-187220 | 7/1992 |

(Continued)

*Primary Examiner* — David C Mellon
*Assistant Examiner* — Pranav Patel
(74) *Attorney, Agent, or Firm* — Hamre, Schumann, Mueller & Larson, P.C.

(57) ABSTRACT

A spiral separation membrane element (1A) includes: a wound body (3) including a separation membrane; a core tube (2) that penetrates the wound body (3) along the central axis of the wound body (3); and a joining portion (4) that joins the wound body (3) to the core tube (2) at at least one end face (3a) of the wound body (3). The joining portion (4) has a holding portion (41) disposed inwardly of the end face (3a) of the wound body (3) and an extending portion (42) formed integrally with the holding portion (41). The spiral separation membrane element (1A) further includes a restraining member (5A) that secures the extending portion (42) to the core tube (2).

8 Claims, 5 Drawing Sheets

(56) References Cited

U.S. PATENT DOCUMENTS

| | | | | |
|---|---|---|---|---|
| 5,611,930 A | * | 3/1997 | Nguyen | B01D 61/362 210/500.3 |
| 5,702,503 A | * | 12/1997 | Tse Tang | B01D 53/228 427/434.3 |
| 6,565,747 B1 | | 5/2003 | Shintani et al. | |
| 2004/0195164 A1 | | 10/2004 | Hirokawa et al. | |
| 2009/0065426 A1 | | 3/2009 | Ishii et al. | |
| 2009/0127182 A1 | * | 5/2009 | Tortosa | B01D 63/10 210/321.74 |
| 2012/0228208 A1 | * | 9/2012 | Tayalia | B01D 63/106 210/321.83 |

FOREIGN PATENT DOCUMENTS

| | | |
|---|---|---|
| JP | 10-005555 | 1/1998 |
| JP | 11-169683 | 6/1999 |
| JP | 11-179168 | 7/1999 |
| JP | 2000-157844 | 6/2000 |
| JP | 2000-354742 | 12/2000 |
| JP | 2003-275545 | 9/2003 |
| JP | 2004-074024 | 3/2004 |
| JP | 2004-305823 | 11/2004 |
| JP | 2006-326376 | 12/2006 |
| JP | 2009-518181 | 5/2009 |
| KR | 10-2008-0094836 | 10/2008 |
| WO | 2007/067751 | 6/2007 |

* cited by examiner

SPIRAL SEPARATION MEMBRANE ELEMENT

TECHNICAL FIELD

The present invention relates to a spiral separation membrane element using a separation membrane.

BACKGROUND ART

Conventionally, various types of separation membrane elements such as tubular type, hollow fiber type, spiral type, and pleated type elements are used to concentrate raw fluids such as liquids and gasses or to separate specific components from the raw fluids. For example, Patent Literature 1 describes a spiral separation membrane element having a wound body including separation membranes, a feed-side carrier material and a permeate-side carrier material that are spirally wound around a core tube.

In a spiral separation membrane element, in general, a wound body is joined to a core tube at both axial ends of the wound body. For example, Patent Literature 2 describes that two rectangular separation membranes and a permeate-side carrier material sandwiched therebetween are bonded together with an adhesive along the three edges of each of the membranes and the carrier material so as to form an envelope to be spirally wound around a core tube, and the resulting wound body is bonded to the core tube at the end faces of the wound body, using the adhesive of the two opposite edges of the envelope.

When a spiral separation membrane element is used, the spiral separation membrane element is loaded in a cylindrical pressure vessel and a pressure difference is given between the feed side and the permeate side with the separation membrane interposed therebetween while a raw fluid is passed through the pressure vessel. Thus, concentration or separation through the separation membrane takes place.

Spiral separation membrane elements may be exposed to high temperature environments in some applications. For example, when a spiral separation membrane element is used for processing treatment of foods, medicines and fine chemicals or waste water treatment after the processing of them, high-temperature treatment water or treatment water vapor is fed into the spiral separation membrane element. In a spiral separation membrane element used for extraction of alcohol, etc. using a pervaporation (PV) method or a vapor permeation (VP) method (see, for example, Patent Literature 3), high-temperature vapor generated from a high-temperature aqueous solution permeates through a separation membrane.

CITATION LIST

Patent Literature

Patent Literature 1 JP 2000-354742 A
Patent Literature 2 JP 2009-518181 T
Patent Literature 3 JP 04(1992)-187220 A

SUMMARY OF INVENTION

Technical Problem

When a spiral separation membrane element is used in such a high-temperature environment as mentioned above, a joining portion between a separation membrane and a core tube is subjected to thermal stress due to the difference in materials used for them. Specifically, the separation membrane repeats expansion and contraction due to changes in temperature at the start and stop of the operation, and thereby the joining portion is subjected to stress. As a result, when a wound body is joined to the core tube only at the end faces of the wound body, the joining portions therebetween may be separated from the core tube.

In view of these circumstances, it is an object of the present invention to provide a spiral separation membrane element suitable for preventing separation of a joining portion from a core tube.

Solution to Problem

In order to solve the above problem, the present invention provides a spiral separation membrane element including: a wound body including a separation membrane; a core tube that penetrates the wound body along a central axis of the wound body; a joining portion that joins the wound body to the core tube at at least one end face of the wound body, the joining portion including: a holding portion disposed inwardly of the end face of the wound body; and an extending portion formed integrally with the holding portion and extending from the holding portion in a direction the end face of the wound body faces, along an outer peripheral surface of the core tube; and a restraining member that secures the extending portion to the core tube.

Advantageous Effects of Invention

The structure described above allows the restraining member to restrain the radially outward expansion of the joining portion. Thus, the separation of the joining portion from the core tube can be prevented.

DESCRIPTION OF EMBODIMENTS

Hereinafter, embodiments of the present invention will be described with reference to the drawings. The following description relates to exemplary embodiments of the present invention, and the present invention is not limited to these embodiments.

(First Embodiment)

Figure 1:
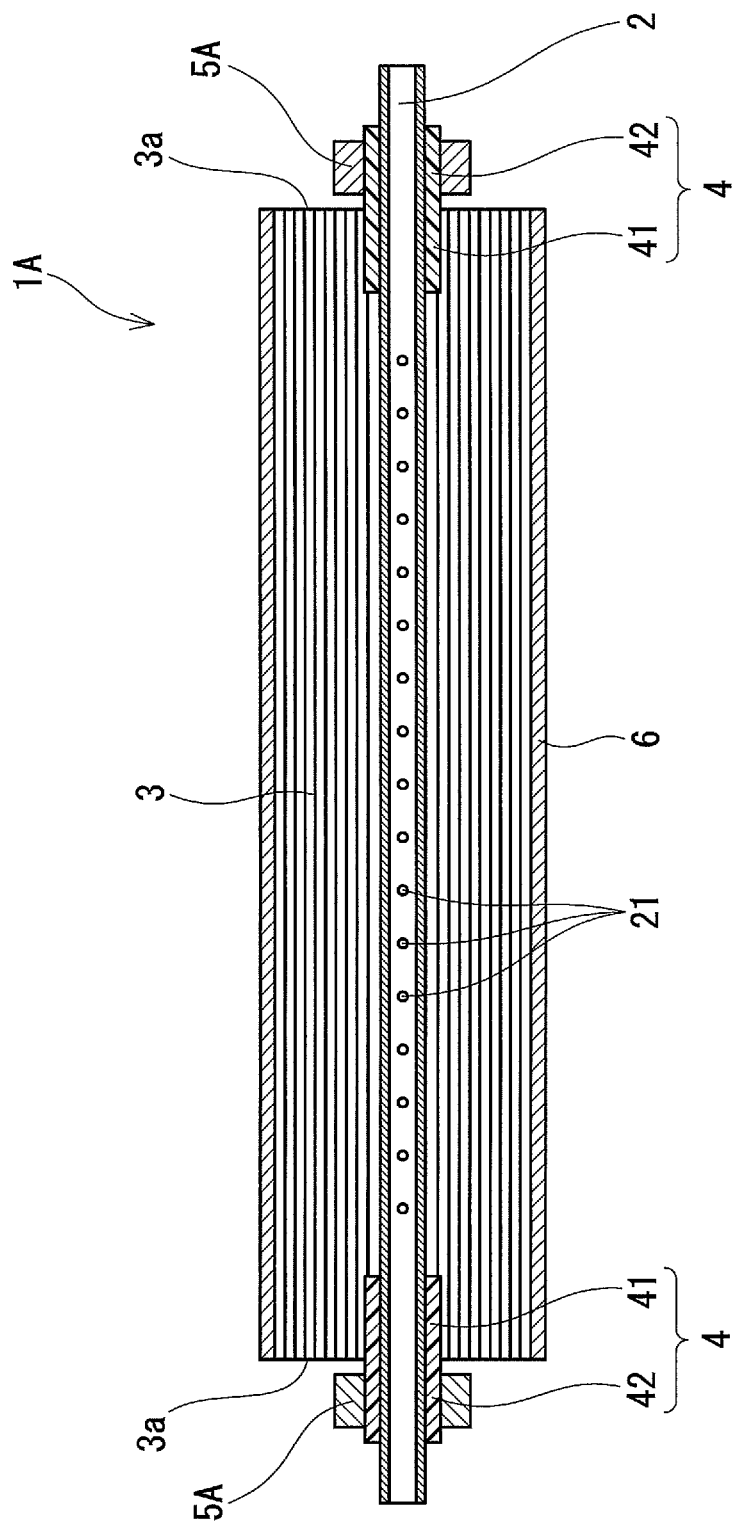
FIG. 1 is a cross-sectional view of a spiral separation membrane element according to a first embodiment of the present invention.

FIG. 1 shows a spiral separation membrane element 1A according to the first embodiment of the present invention (hereinafter simply referred to as a "separation membrane element 1A"). This separation membrane element 1A includes a wound body 3 including separation membranes 31 (see FIG. 3), a core tube 2 that penetrates the wound body 3 along the central axis of the wound body 3, and a pair of joining portions 4 that join the wound body 3 to the core tube 2 at both end faces 3a of the wound body 3. In the present embodiment, a sheath material 6 is used to cover and protect the wound body 3. It is preferable to dispose end holding members at both axial ends of the wound body 3 to protect the end faces of the wound body 3 and to prevent telescopic extension of the wound body 3.

A raw fluid is fed into the separation membrane element 1A from one of the end faces 3a of the wound body 3, and is separated into a permeated fluid and a concentrated fluid through the separation membranes 31. The permeated fluid is introduced to the outside through the core tube 2, and the concentrated fluid is discharged from the other end face 3a of the wound body 3. For example, in the case where the separation membrane element 1A is used for desalination of seawater, the raw fluid, the permeated fluid and the concentrated fluid are all liquids. In the case where the separation membrane element 1A is used, for example, for concentration of an alcohol solution or separation of alcohol from an alcohol solution by the PV method or the VP method, at least the permeated fluid is a vapor and the raw fluid and the concentrated fluid are liquids or vapors depending on the whole system configuration.

The core tube 2 serves as a fluid collecting pipe for collecting the permeated fluid. The core tube 2 is provided with a plurality of inlet holes 21 for introducing the permeated fluid thereinto.

Any known material used for a fluid collecting pipe can be used as the material of the core tube 2. For example, resin materials such as acrylonitrile-butadiene-styrene copolymer resin (ABS resin), polyphenylene ether resin (PPE resin) and polysulfone resin (PSF resin), or metal materials such as stainless steel and titanium can be used. Particularly in the case of high-temperature operation, the core tube 2 made of metal is preferably used.

The inner diameter of the core tube 2 varies depending on the size of the wound body 3 used, and it is, for example, about 20 to 100 mm. The wall thickness of the core tube 2 varies depending on the intended use, and it is, for example, about 1 to 7 mm.

Figure 3:
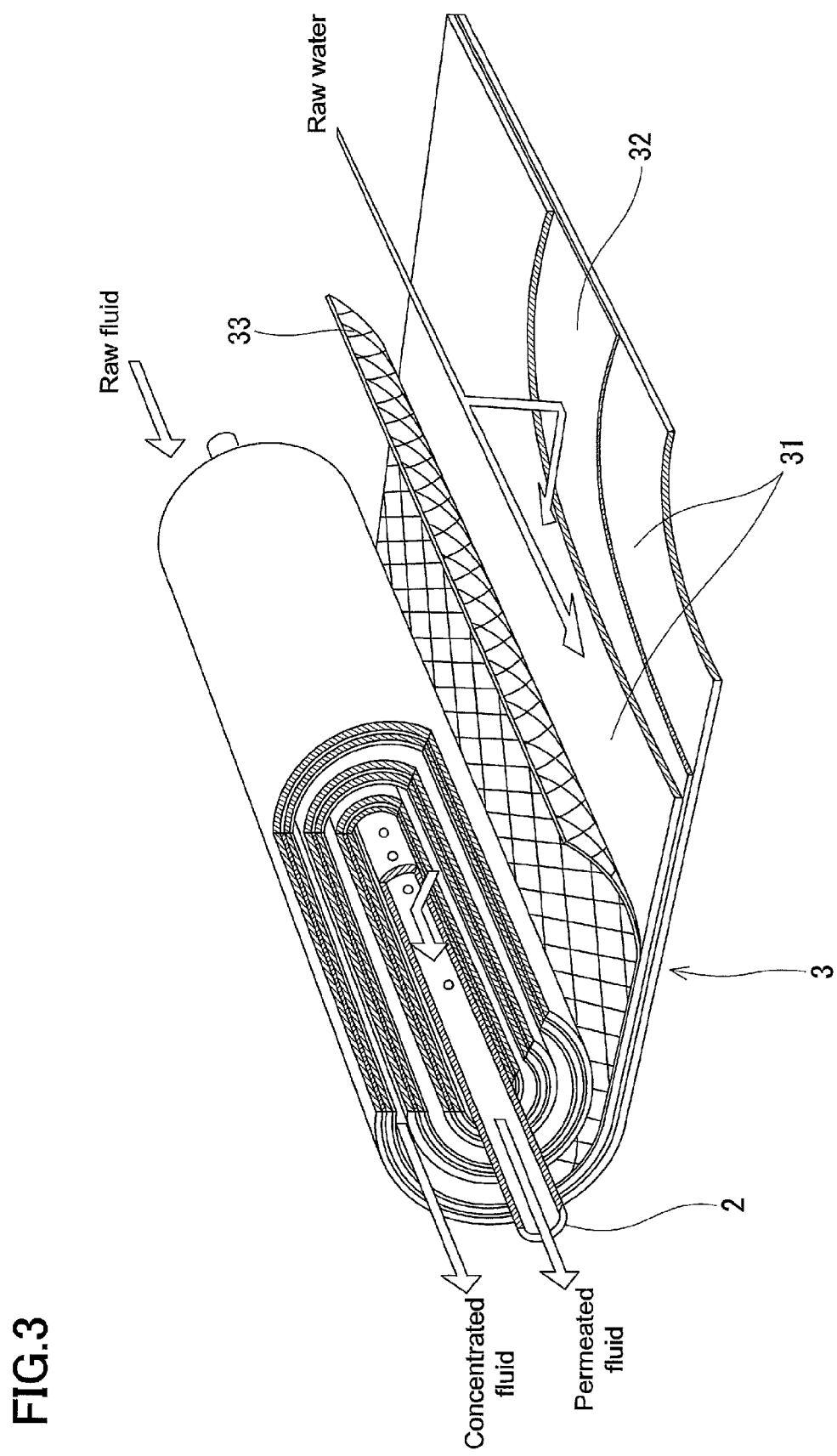
FIG. 3 is a diagram showing a structure of a wound body.

As shown in FIG. 3, the wound body 3 includes a feed-side carrier material 33 and an envelope-like membrane leaf composed of the separation membranes 31 and a permeate-side carrier material 32 sandwiched therebetween, and the membrane leaf and the feed-side carrier material 33 are spirally wound together around the core tube 2. The number of membrane leaves and feed-side carrier materials 33 is not limited to one, and a plurality of membrane leaves and feed-side carrier materials may be used.

The pair of separation membranes 31 and the permeate-side carrier material 32 that constitute the membrane leaf, and the feed-side carrier material 33 each have a rectangular shape and are spirally wound in one of the opposite side directions. The separation membranes 31 are bonded together with an adhesive along the three edges of each of the membranes so as to form an envelope-like membrane leaf having an opening at one side, and the opening communicates with the inlet holes 21 of the core tube 2. The permeate-side carrier material 32 forms a flow path for allowing the permeated fluid to flow between the separation membranes 31 that are bonded to each other. The feed-side carrier material 33 forms a flow path for allowing the raw fluid to flow between the adjacent surfaces of the spirally wound membrane leaf.

Figure 4:
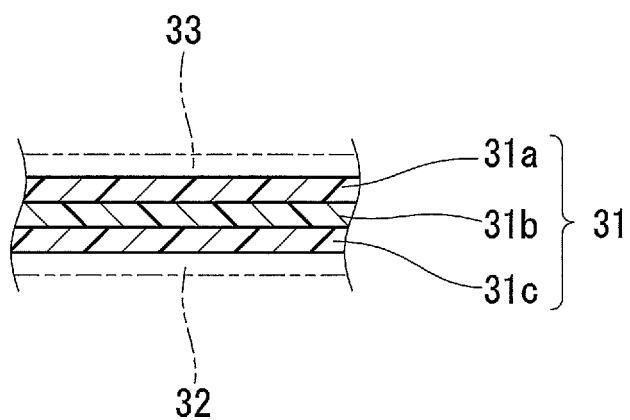
FIG. 4 is a diagram showing a structure of a separation membrane.

Various separation membranes of different structures can be used for the separation membrane 31 according to the intended use thereof. For example, in the PV method or the VP method, the separation membrane 31 of a structure as shown in FIG. 4 can be used. This separation membrane 31 includes a skin layer 31a that faces the feed-side carrier material 33, a support layer 31b that supports the skin layer 31a, and a nonwoven fabric 31c attached to the support layer 31b.

The skin layer 31a is a non-porous and homogeneous membrane. As the skin layer 31a, for example, a flat membrane made of a known material such as polyphenylene sulfide (PPS), polyvinylidene fluoride (PVDF), polydimethylsiloxane (PDMS) or a cellulose-based resin, or a composite membrane of these materials can be used. Particularly from the viewpoint of heat resistance for high-temperature processing, it is preferable that the skin layer 31a be made of a fluorine-containing resin or a cellulose-based resin.

The material of the support layer 31b is, for example, PVDF, and the material of the nonwoven fabric 31c is, for example, PPS.

As the permeate-side carrier material 32 or the feed-side carrier material 33, for example, a resin net made of PPS or ethylene-chlorotrifluoroethylene copolymer (ECTFE) can be used. Preferably, the mesh size of the feed-side carrier material 33 is larger than that of the permeate-side carrier material 32.

The sheath material 6 that covers the wound body 3 is formed, for example, by coating the outer peripheral surface of the wound body 3 with glass fiber-reinforced polymer (FRP) or silicone resin, for example.

The joining portions 4 disposed at both axial ends of the wound body 3 are made from an adhesive. The adhesive forming these joining portions 4 may be the same as or different from the adhesive used for bonding the separation membranes 31. As the adhesive forming the joining portions 4, any conventionally known adhesive can be used. Examples of the adhesive include thermosetting resin adhesives, such as urethane resin, epoxy resin and silicone resin-based adhesives, and hot melt adhesives. However, it is preferable to use a thermosetting resin adhesive that cures when heated, from the viewpoint of workability. It is particularly preferable to use a silicone resin-based adhesive because of its excellent heat resistance and high flexibility.

In the present embodiment, the joining portions 4 are formed into an annular shape extending from the end faces 3a of the wound body 3 in both axial directions thereof along the outer peripheral surface of the core tube 2. Specifically, each of the joining portions 4 has a holding portion 41 disposed inwardly of the end face 3a of the wound body 3 and an extending portion 42 formed integrally with the holding portion 41. The extending portion 42 extends from the holding portion 41 in a direction the end face 3a of the wound body 3 faces. The extending portion 42 is secured to the core tube 2 by a restraining member.

Figure 2:
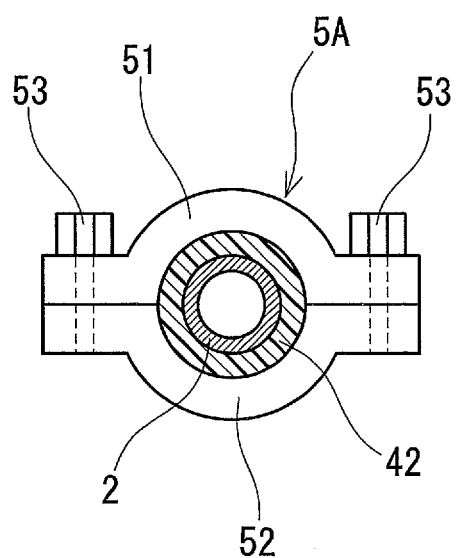
FIG. 2 is a cross-sectional side view showing how a restraining member secures an extending portion of a joining portion in the first embodiment.

In the present embodiment, a clamping member 5A capable of clamping the extending portion 42 onto the core tube 2 is used as the restraining member. As shown in FIG. 2, the clamping member 5A includes a pair of clamping jaws 51 and 52, each having a semicicrular cross section provided with engaging portions projecting from both ends of the semicircle. When the engaging portions of the clamping jaws 51 and 52 are fastened together with bolts 53, the extending portion 42 is pressed from outside against the core tube 2 by the clamping jaws 51 and 52. Thus, the extending portion 42 is secured to the core tube 2. The structure of the clamping member 5A is not limited to this. For example, the clamping member 5A may be structured to have an approximately Ω-shaped cross section with an outwardly flared portion so that the flared portion is closed with bolts and nuts.

Preferably, the clamping member 5A is made of a material having a low coefficient of linear expansion, such as stainless steel. A plastic material also can be used as a material of the clamping member 5A, if the plastic material has a lower coefficient of linear expansion than the adhesive forming the joining portion 4.

Next, a method for producing the above-described separation membrane element 1A is described.

First, the adhesive that is to form the joining portions 4 is applied to two predetermined areas spaced apart from each other on the outer peripheral surface of the core tube 21. Next, the membrane leaf and the feed-side carrier material 33 are spirally wound around the core tube 2 in such a manner that the adhesive applied to the areas is partially exposed on both sides of the wound membrane leaf and carrier material, and they are held in place until the adhesive is cured. Thus, the joining portions 4 each including the holding portion 41 and the extending portion 42 are formed. Then, the clamping members 5A are attached to the extending portions 42.

In the separation membrane element 1A described above, the clamping members 5A restrain the radially outward expansion of the joining portions 4. Therefore, even if the separation membrane element 1A is exposed to a high-temperature environment and the separation membranes 31 repeat expansion and contraction, the separation of the joining portions 4 from the core tube 2 can be prevented.

(Second Embodiment)

Figure 5A:
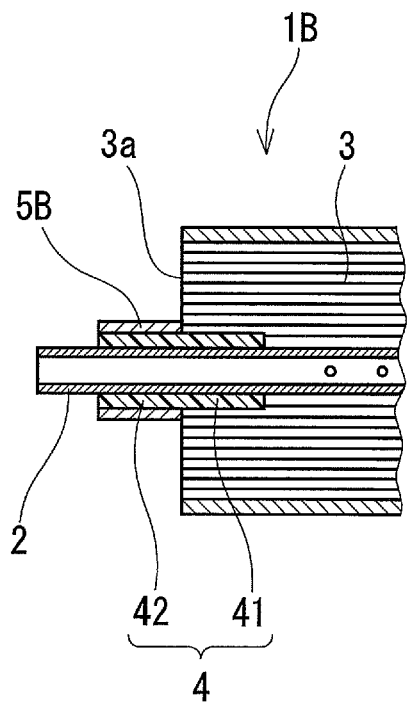
FIG. 5A is a cross-sectional view of a spiral separation membrane element according to a second embodiment of the present invention.
Figure 5B:
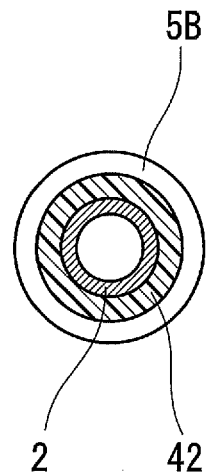
FIG. 5B is a cross-sectional side view showing how a restraining member secures an extending portion of a joining portion in the second embodiment.

Next, a spiral separation membrane element 1B according to the second embodiment of the present invention (hereinafter simply referred to as a "separation membrane element 1B") is described with reference to FIG. 5A and FIG. 5B. In the present embodiment, the same reference numerals are used to designate the same parts as in the first embodiment, and the description thereof is omitted. FIG. 5A illustrates only one end portion of the separation membrane element 1B, but the other end portion thereof has the same structure.

In the present embodiment, a tubular member 5B having an inner diameter larger than the outer diameter of the core tube 2 is used as a restraining member for securing the extending portion 42 to the core tube 2. The tubular member 5B is put on the core tube 2 in close contact with the end face 3a of the wound body 3, and the extending portion 42 fills a gap between the tubular member 5B and the core tube 2. The tubular member 5B is firmly bonded to the central tube 2 by the extending portion 42.

Preferably, the tubular member 5B is made of a material having a low coefficient of linear expansion, as in the case of the clamping member 5A in the first embodiment.

Next, a method for producing the above-described separation membrane element 1B is described.

First, the membrane leaf and the feed-side carrier material 33 are spirally wound around the core tube 2 to form the wound body 3. Then, the tubular members 5B are threaded onto the end portions of the core tube 2 until they contact the end faces 3a of the wound body 3. Next, the adhesive that is to form each of the joining portions 5 is poured into the gap between the tubular member 5B and the core tube 21 so that the adhesive fills the gap between the tubular member 5B and the core tube 2. Then, the adhesive is cured. Thus, the joining portions 4 each including the holding portion 41 and the extending portion 42 are formed, and the tubular members 5B are firmly bonded to the core tube 2 by the extending portions 42.

In the separation membrane element 1B described above, the tubular members 5B restrain the radially outward expansion of the joining portions 4. Therefore, even if the separation membrane element 1B is exposed to a high-temperature environment and the separation membranes 31 repeat expansion and contraction, the separation of the joining portions 4 from the central tube 2 can be prevented.

(Other Embodiments)

Both of the pair of joining members 4 have the extending portions 42 in the first and second embodiments, but one of the joining members 4 does not have to have the extending portion 42. In this case, only one of the joining portions 4 having the extending portion 42 corresponds to the joining portion of the present invention. The joining portion of the present invention has only to join the wound body 3 to the core tube 2 at at least one end face 3a of the wound body 3.

When the clamping member 5A is used as a restraining member, the extending member 42 does not necessarily have to have an annular cross section. For example, the extending portion 42 may be composed of a plurality of equiangularly spaced projecting strips extending from the holding portion 41 in the axial direction of the core tube 2.

DESCRIPTION OF REFERENCE NUMERALS 1A, 1B: Spiral separation membrane element
2: Core tube
3: Wound body
3a: End face
31: Separation membrane
31a: Skin layer
31b: Support layer
31c: Nonwoven fabric
32: Permeate-side carrier material
33: Feed-side carrier material
4: Joining portion
41: Holding portion
42: Extending portion
5A: Clamping member (restraining member)
5B: Tubular member (restraining member)

The invention claim is:

1. A spiral separation membrane element comprising:
a wound body including a separation membrane;
a core tube that penetrates the wound body along a central axis of the wound body;
a joining portion that joins the wound body to the core tube at at least one end face of the wound body, the joining portion including: a holding portion disposed inwardly of the end face of the wound body; and an extending portion formed integrally with the holding portion and extending from the holding portion in a direction the end face of the wound body faces, without being in contact with the end face of the wound body outwardly from the holding portion, along an outer peripheral surface of the core tube; and
a restraining member that secures the extending portion to the core tube.

2. The spiral separation membrane element according to claim 1, wherein the restraining member is a clamping member capable of clamping the extending portion onto the core tube.

3. The spiral separation membrane element according to claim 1, wherein the restraining member is a tubular member that is put on the core tube in close contact with the end face of the wound body, and the extending portion fills a gap between the tubular member and the core tube.

4. The spiral separation membrane element according claim 1, wherein the core tube is made of metal.

5. The spiral separation membrane element according to claim 1, wherein the joining portion is made from a thermosetting resin adhesive.

6. The spiral separation membrane element according to claim 1, wherein the wound body includes an envelope-like membrane leaf and a feed-side carrier material that are spirally wound together around the core tube, the membrane leaf being composed of the separation membranes and a permeate-side carrier material sandwiched between the separation membranes.

7. The spiral separation membrane element according to claim 6, wherein the separation membrane includes a skin layer that faces the feed-side carrier material, a support layer that supports the skin layer, and a nonwoven fabric laminated on the support layer, and the skin layer is a non-porous and homogeneous membrane made of a fluorine-containing resin or a cellulose-based resin.

8. The spiral separation membrane element according to claim 1, wherein the Restraining member is spaced from the end face of the wound body in the direction the end face of the wound body faces.

* * * * *